United States Patent
Hashimoto

(10) Patent No.: US 10,073,467 B2
(45) Date of Patent: Sep. 11, 2018

(54) VEHICLE TRAVELING CONTROL APPARATUS

(71) Applicant: ADVICS CO., LTD., Kariya-shi (JP)

(72) Inventor: Yosuke Hashimoto, Kariya (JP)

(73) Assignee: ADVICS CO., LTD., Kariya-shi (JP)

( * ) Notice: Subject to any disclaimer, the term of this patent is extended or adjusted under 35 U.S.C. 154(b) by 0 days.

(21) Appl. No.: 15/516,313

(22) PCT Filed: Oct. 19, 2015

(86) PCT No.: PCT/JP2015/079475
§ 371 (c)(1),
(2) Date: Mar. 31, 2017

(87) PCT Pub. No.: WO2016/063841
PCT Pub. Date: Apr. 28, 2016

(65) Prior Publication Data
US 2017/0297453 A1 Oct. 19, 2017

(30) Foreign Application Priority Data

Oct. 20, 2014 (JP) ................................. 2014-214008

(51) Int. Cl.
*G05D 3/12* (2006.01)
*B60L 3/00* (2006.01)
(Continued)

(52) U.S. Cl.
CPC .............. *G05D 3/12* (2013.01); *B60L 3/0076* (2013.01); *B60L 3/0084* (2013.01); *B60L 3/108* (2013.01);
(Continued)

(58) Field of Classification Search
USPC ......................................................... 701/23
See application file for complete search history.

(56) References Cited

U.S. PATENT DOCUMENTS 8,319,663 B2 * 11/2012 Von Reyher ......... B62D 15/028
180/167
8,779,939 B2 * 7/2014 Barth .................... B62D 15/027
180/199
(Continued)

FOREIGN PATENT DOCUMENTS

JP 2006-296135 A 10/2006

OTHER PUBLICATIONS

International Search Report dated Jan. 12, 2016 in PCT/JP2015/079475 filed Oct. 19, 2015.

*Primary Examiner* — Dirk Wright
(74) *Attorney, Agent, or Firm* — Oblon, McClelland, Maier & Neustadt, L.L.P.

(57) ABSTRACT

A traveling control apparatus includes an operation amount calculating unit for calculating the amount of operations for controlling at least one of a driving mechanism and a braking mechanism of a vehicle to make the difference between a target position and the actual position of the vehicle small; a determining unit for determining whether the actual position follows the target position; and a target position setting unit for setting the target position that changes with time passage, when it is determined by the determining unit that the actual position follows the target position. The target position setting unit sets the target position so a change in the target position with the time passage becomes smaller than that in the case where it is determined that the actual position follows the target position, when it is determined by the determining unit that the actual position does not follow the target position.

8 Claims, 8 Drawing Sheets

(51) Int. Cl.
*B60L 3/10* (2006.01)
*G05D 1/02* (2006.01)
*G05D 1/12* (2006.01)
B60L 15/20 (2006.01)
B60L 3/12 (2006.01)
B60T 7/12 (2006.01)

(52) U.S. Cl.
CPC ............ *G05D 1/0212* (2013.01); *G05D 1/12* (2013.01); *B60L 3/12* (2013.01); *B60L 15/2018* (2013.01); *B60L 15/2045* (2013.01); *B60T 7/12* (2013.01); *G05D 2201/0213* (2013.01)

(56) References Cited

U.S. PATENT DOCUMENTS

| | | | |
|---|---|---|---|
| 9,274,527 B2* | 3/2016 | Kim | B62D 15/027 |
| 9,767,366 B1* | 9/2017 | Fairfield | G06K 9/00805 |
| 2015/0088360 A1* | 3/2015 | Bonnet | B60W 30/06 701/23 |
| 2015/0149265 A1* | 5/2015 | Huntzicker | B60W 30/06 705/13 |

* cited by examiner

[FIG.1A]
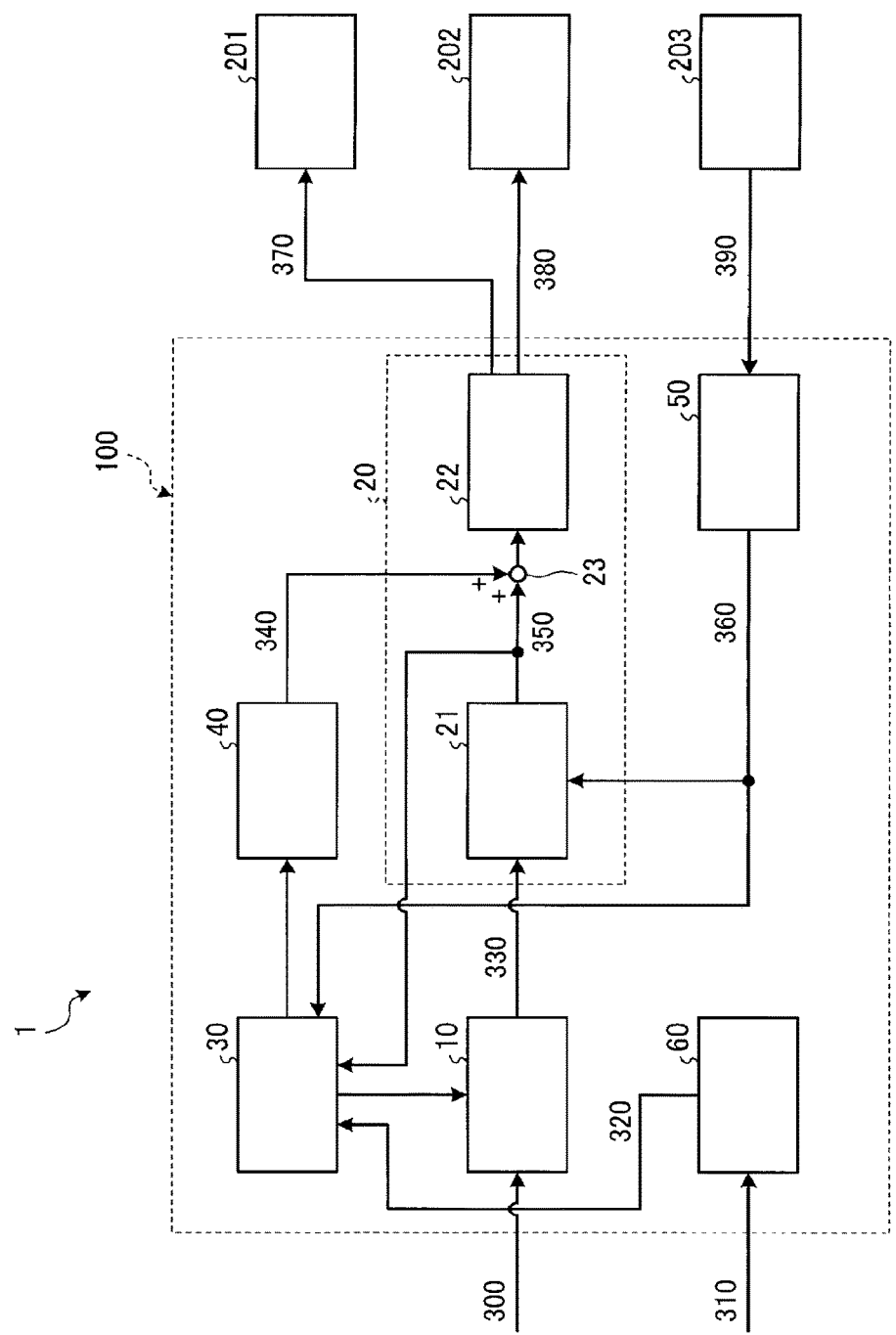

[FIG.1B]

| | | |
|---|---|---|
| 10 | TARGET VALUE SETTING UNIT |
| 20 | CONTROL UNIT |
| 21 | OPERATION AMOUNT CALCULATING UNIT |
| 22 | COMMAND VALUE CALCULATING UNIT |
| 23 | ADDER |
| 30 | DETERMINING UNIT |
| 40 | ADDITIONAL AMOUNT CALCULATING UNIT |
| 50 | ACTUAL VALUE ACQUIRING UNIT |
| 60 | THRESHOLD VALUE SETTING UNIT |
| 100 | CONTROL APPARATUS |
| 201 | DRIVING MECHANISM |
| 202 | BRAKING MECHANISM |
| 203 | SENSOR |
| 300 | END POSITION |
| 310 | OBSTACLE DATA |
| 320 | FIRST THRESHOLD VALUE |
| 330 | TARGET VALUE |
| 340 | ADDITIONAL AMOUNT |
| 350 | AMOUNT OF OPERATION |
| 360 | ACTUAL VALUE |
| 370 | DRIVING COMMAND VALUE |
| 380 | BRAKING COMMAND VALUE |
| 390 | DETECTION VALUE |

[FIG.2]
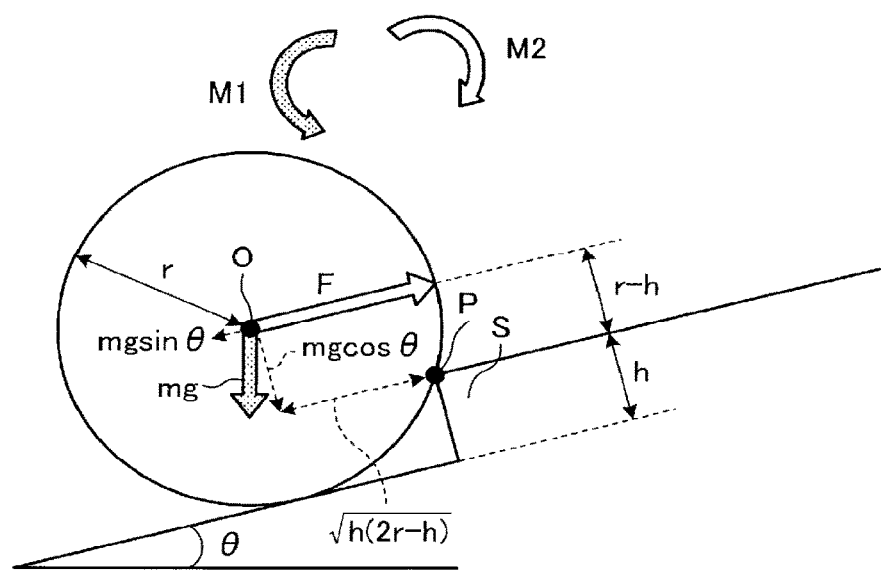

[FIG.3]
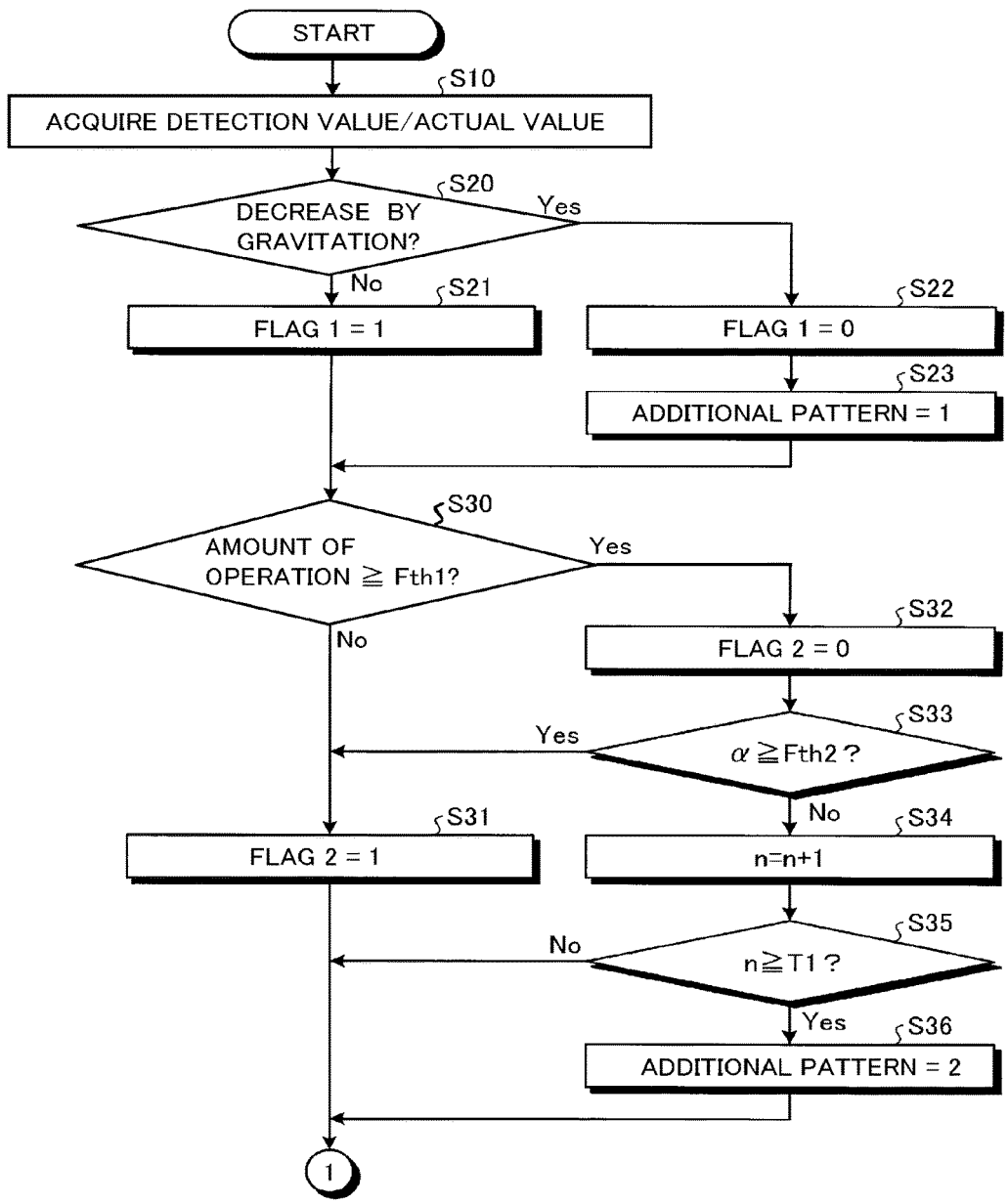

[FIG.4]
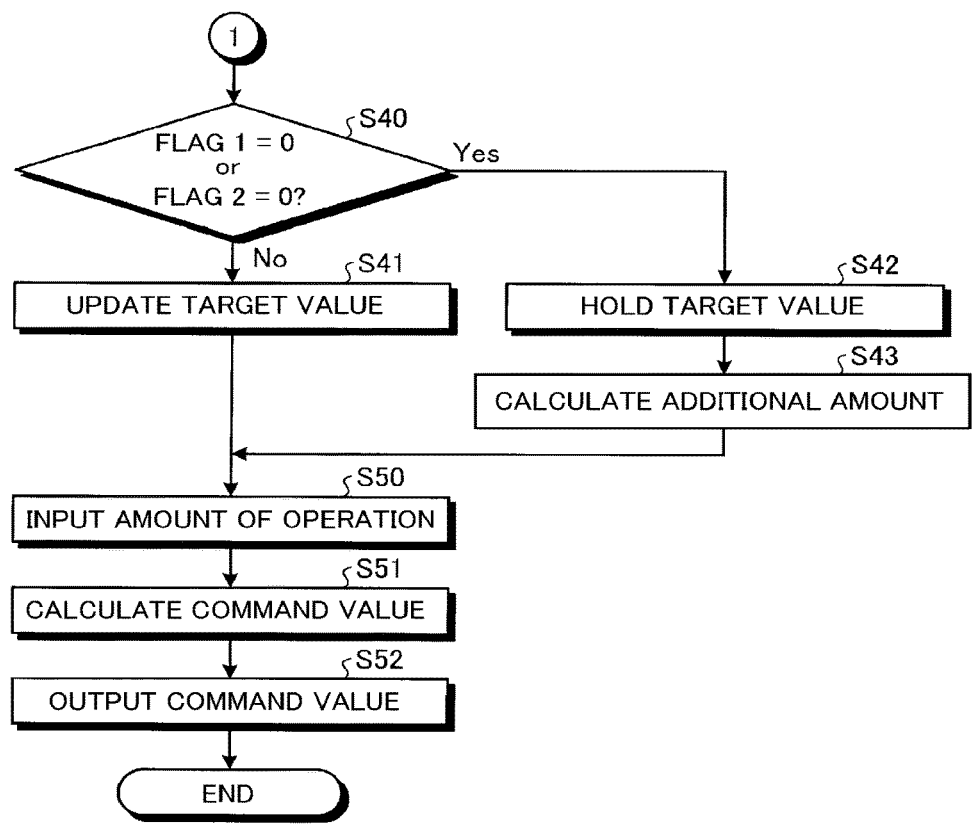

[FIG.5]
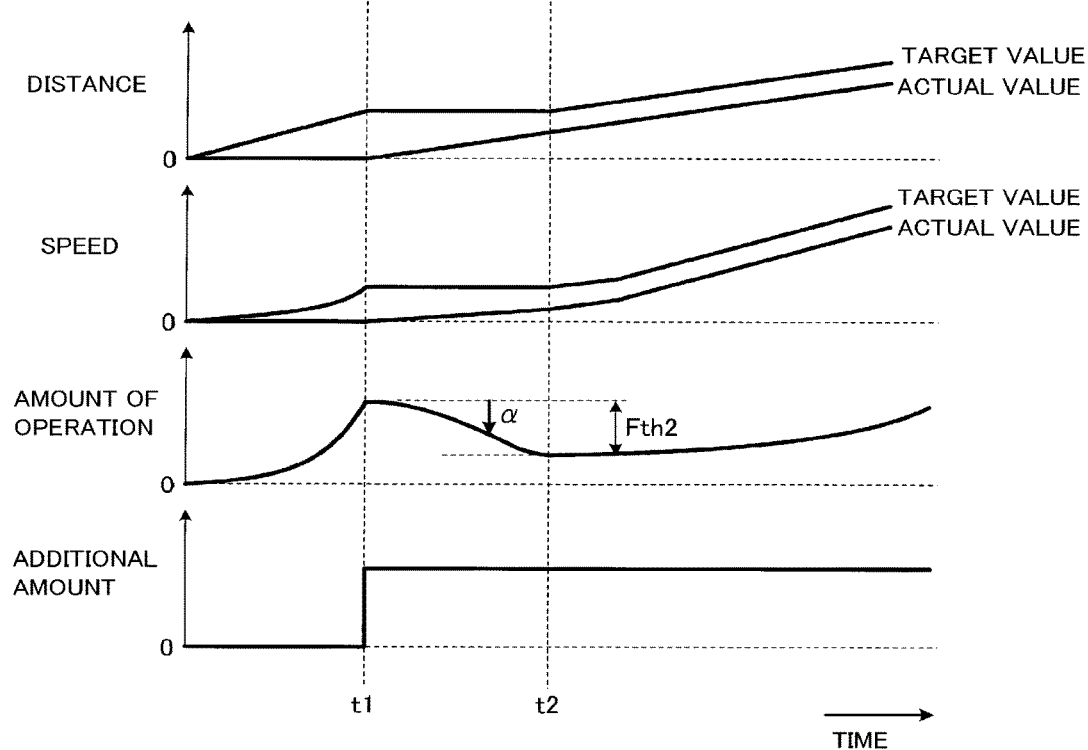

[FIG.6]
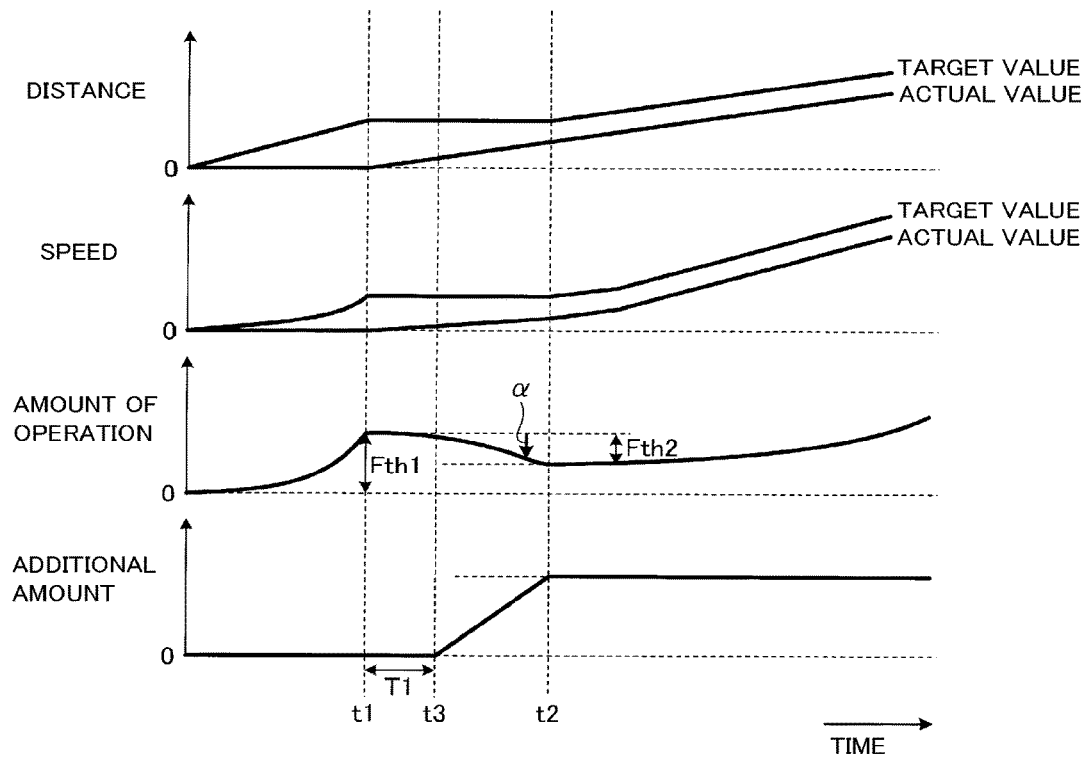

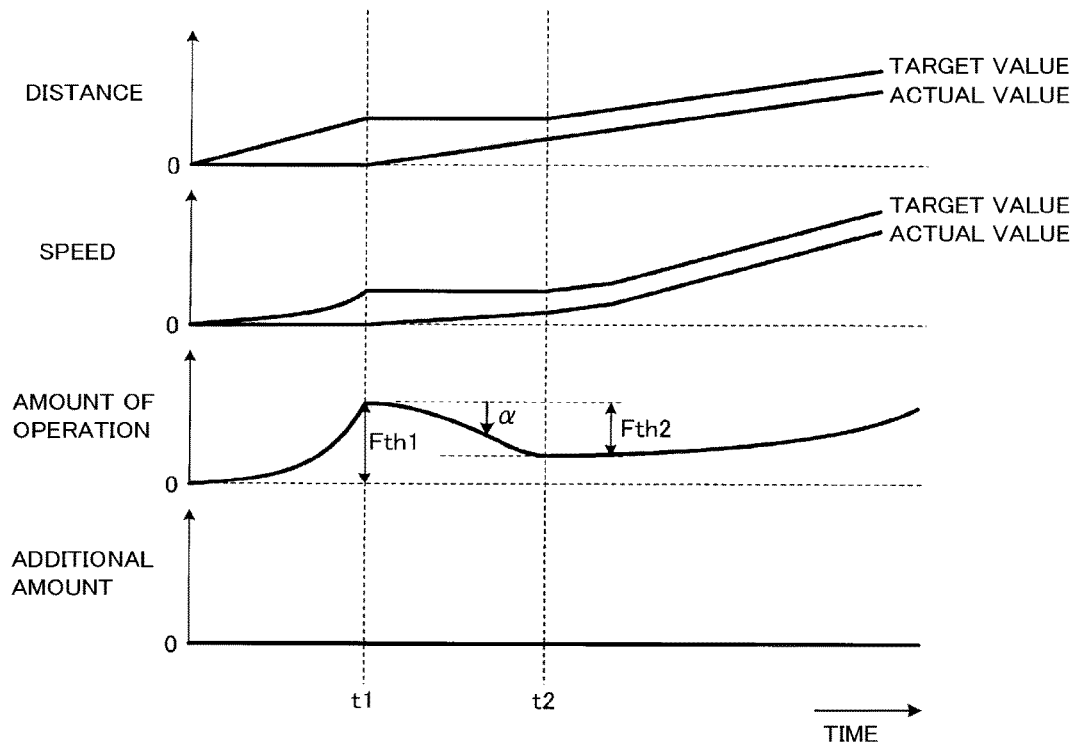
[FIG.7]

VEHICLE TRAVELING CONTROL APPARATUS

TECHNICAL FIELD

The present invention relates to a vehicle traveling control apparatus.

BACKGROUND ART

In the past, a parking assistant system which causes a vehicle to go over a step with feedback control for a rotating angle of a motor has been known (for example, Patent Literature 1).

CITATIONS LIST

Patent Literature

Patent Literature 1: Japanese Unexamined Patent Publication No. 2006-296135

SUMMARY OF INVENTION

Technical Problems

In feedback control in vehicle traveling, an amount of operation for controlling an object to be controlled is undesirably excessive. Thus, one of problems of the present invention is, for example, to obtain a vehicle traveling control apparatus having a novel configuration which can adjust or set an amount of operation for controlling an object to be controlled.

Solution to Problem

A vehicle traveling control apparatus according to the present invention includes, for example, an operation amount calculating unit which calculates an amount of operation for controlling at least one of a driving mechanism and a braking mechanism of a vehicle to decrease a deviation between a target position and an actual position of the vehicle, a determining unit which determines whether the actual position follows the target position, and a target position setting unit which, when the determining unit determines that the actual position follows the target position, sets the target position changing with elapsed time and, when the determining unit determines that the actual position does not follow the target position, sets the target position such that a change of the target position with elapsed time is smaller than the change of the target position with elapsed time when the determining unit determines that actual position follows the target position.

In the vehicle traveling control apparatus, for example, the determining unit determines that the actual position does not follow the target position when the amount of operation is equal to or larger than a first threshold value.

The vehicle traveling control apparatus includes, for example, a threshold value setting unit which changes the first threshold value depending on a height of an obstacle.

In the vehicle traveling control apparatus, for example, the determining unit determines that the actual position does not follow the target position when it is detected that a vehicle goes down a slope by gravitation.

In the vehicle traveling control apparatus, for example, the determining unit determines that the actual position begins to follow the target position when a decrease of the amount of operation after the determining unit determines that the actual position does not follow the target position is equal to or larger than a second threshold value.

The vehicle traveling control apparatus includes, for example, an additional amount calculating unit which calculates an additional amount added to the amount of operation when the determining unit determines that the actual position does not follow the target position.

In the vehicle traveling control apparatus, for example, the additional amount calculating unit calculates the additional amount which is constant in terms of time after the determining unit determines that the actual position does not follow the target position.

In the vehicle traveling control apparatus, for example, the additional amount calculating unit increases the additional amount with time, stops the increase of the additional amount when the determining unit determines that the actual position follows the target position, and holds the additional amount added to the amount of operation constant after that time.

BRIEF DESCRIPTION OF DRAWINGS

FIG. 1A is an illustrative block diagram of a schematic configuration of a vehicle traveling control apparatus according to an embodiment.

FIG. 1B is a caption of FIG. 1A.

FIG. 2 is an illustrative conceptual view of force and moment generated when a wheel goes over a step.

FIG. 3 is an illustrative flow chart showing a control procedure by the vehicle traveling control apparatus according to the embodiment.

FIG. 4 is an illustrative flow chart showing a control procedure by the vehicle traveling control apparatus according to the embodiment and showing a procedure subsequent to the procedure in FIG. 3.

FIG. 5 is a graph showing an example of a change in parameter with time in the vehicle traveling control apparatus according to the embodiment.

FIG. 6 is a graph showing another example of the change in parameter with time in the vehicle traveling control apparatus according to the embodiment.

FIG. 7 is a graph showing still another example of the change in parameter with time in the vehicle traveling control apparatus according to the embodiment.

DESCRIPTION OF EMBODIMENT

An illustrative embodiment of the present invention will be disclosed below. A configuration of the embodiment (will be described below) and an operation and a result (advantage) obtained by the configuration are examples. The present invention can also be achieved by a configuration except for the configuration disclosed in the following embodiment. According to the present invention, at least one of various advantages (including ramifications) obtained by the configuration can be achieved.

A control apparatus 100, in a control section up to an end position, i.e., a final target position, controls at least one of a driving mechanism 201 and a braking mechanism 202, and thus controls at least one of acceleration and deceleration of a vehicle 1. The control apparatus 100 can be configured as a part of, for example, a parking assistant system, an automatic travel control system, an automatic driving system, or the like. The driving mechanism 201 is, for example, an internal combustion, a motor, or the like, and includes an ECU thereof. The braking mechanism 202 is, for example, an ABS (antilock brake system), and includes an ECU (electronic control unit) thereof. In the following example, the control apparatus 100 does not control the steering, but may control the steering. The driving mechanism 201 or the braking mechanism 202 may be simply called an object to be controlled in the following description.

The control apparatus 100 controls the object to be controlled with control including feedback control. The feedback control is control decreasing a deviation between a target value and an actual value.

The control apparatus 100, as will be illustrated in FIG. 1A, has a target value setting unit 10, a control unit 20, a determining unit 30, an additional amount calculating unit 40, an actual value acquiring unit 50, a threshold value setting unit 60, and the like. The control unit 20 includes an operation amount calculating unit 21, a command value calculating unit 22, and the like.

The target value setting unit 10 acquires data of the end position. The data of the end position is, for example, a moving distance of the vehicle 1 from a start position to the end position. In the control apparatus 100, for example, a positional change of the vehicle 1 in terms of time is set such that a speed gradually increases near the start position in a control section, is held constant at an intermediate position in the control section, and gradually decreases near the end position in the control section. The target value setting unit 10 sets target values of parameters at control timings, i.e., respective times such that the set positional change of the vehicle 1 in terms of time can be obtained in the control section from the start position to the end position. The parameters are, for example, a position and a speed. In the control apparatus 100, a distance from at least one of the start position and the end position in the control section may be set as a position of the vehicle 1. The target value setting unit 10 may calculate target values at control timings, respectively, or may acquire target values calculated in advance and stored at the respective control timings. The target value setting unit 10 is an example of the target position setting unit.

The actual value acquiring unit 50 acquires actual values of the parameters equal to the target values. More specifically, in the embodiment, the actual value acquiring unit 50 acquires, for example, the position of the vehicle 1 and an actual value of the speed of the vehicle 1. The actual value is a value obtained depending on an action of the object to be controlled, which is a detected value or a value derived from the detected value. For example, the position and the actual value of the speed can be calculated from a detected value of a wheel speed sensor serving as a sensor 203. The sensor 203, for example, is a sensor which detects physical quantities such as a position, an attitude, and a state when the vehicle 1 is at a stop or traveling, and may be a sensor except for the wheel speed sensor. The actual value acquiring unit 50 can acquire detection results from the plurality of sensors 203.

The operation amount calculating unit 21 of the control unit 20 calculates an amount of operation for the object to be controlled. The amount of operation increases as a deviation between a target value and an actual value of each parameter increases, and is set to reflect a degree of influence of the parameter. The amount of operation is set to, for example, a dimension of force or a dimension of acceleration. The operation amount calculating unit 21 calculates the amount of operation by multiplying a second-order derivative value obtained by a time of deviation of a position and a first-order derivative value obtained by a time of deviation of a speed by coefficients set depending on the degrees of influence thereof, respectively, and adding to each other. In the embodiment, the amount of operation is set such that the vehicle 1 is accelerated when the amount of operation increases, the object to be controlled is controlled such that the vehicle 1 is accelerated by a positive amount of operation, and controlled such that the vehicle 1 is decelerated by a negative amount of operation. The amount of operation is also called an input value.

The command value calculating unit 22 of the control unit 20 calculates a command value, which corresponds to the amount of operation calculated by the operation amount calculating unit 21, to the object to be controlled. The command value calculating unit 22, for example, calculates a rotational torque command value serving as a driving command value to the driving mechanism 201 such that, when the amount of operation is a positive value, an acceleration corresponding to the magnitude of the amount of operation can be obtained. The command value calculating unit 22, for example, calculates a braking torque command value serving as a braking command value to the braking mechanism 202 such that, when the amount of operation is a negative value, a deceleration, i.e., a negative acceleration corresponding to the magnitude of the amount of operation can be obtained. The command value calculating unit 22 can determine torque allocations of the driving mechanism 201 and the braking mechanism 202 to obtain, for example, a state in which the vehicle 1 is accelerated by the driving mechanism 201 while being braked by the braking mechanism 202, or a state in which the vehicle 1 is decelerated by the braking mechanism 202 while being driven forward by the driving mechanism 201 depending on a traveling situation or the like of the vehicle 1. In this case, the command value calculating unit 22 calculates command values to both the driving mechanism 201 and the braking mechanism 202 depending on the allocations of a driving torque and a braking torque. The command value calculating unit 22, even though the amount of operation is an amount of operation to which the additional amount calculated by the additional amount calculating unit 40 is added, calculates a command value to the object to be controlled depending on the amount of operation to which the additional amount is added.

The determining unit 30 determines whether the actual value follows the target value. In the control apparatus 100, a condition for determining whether the follow is possible is set. The determining unit 30 compares the value of a predetermined parameter and a condition set for the parameter with each other to determine whether the actual value follows the target value.

The determining unit 30 can determine that the actual value does not follow the target value when, for example, the amount of operation is equal to or larger than the preset first threshold value. As described above, the amount of operation increases as the deviation between the target value and the actual value increases. Thus, in a state in which the actual value does not follow the target value, the amount of operation is relatively large. Thus, the amount of operation is compared with the first threshold value to make it possible to determine whether the actual value follows the target value. The amount of operation used in the determination by the determining unit 30 is an amount of operation to which no additional amount is added.

The determining unit 30 can determine that the actual value does not follow the target value, for example, when the vehicle 1 goes down a slope by gravitation. At the start of control or during the control by the control apparatus 100, a state in which the vehicle 1 goes down the slope without thrust or against the thrust can be regarded as a state in which the vehicle 1 goes down the slope by gravitation and the actual value does not follow the target value. The determining unit 30, for example, can detect that the vehicle 1 goes down the slope by gravitation on the basis of a detection value obtained by the wheel speed sensor or the acceleration sensor serving as the sensor 203 or an actual value based on the detection value. The acceleration sensor, for example, can detect an acceleration in a forward or backward direction of the vehicle 1. In this case, for example, when the wheel speed sensor detects a value equal to or larger than a predetermined threshold value and the acceleration sensor detects a value equal to or larger than another predetermined threshold value in a downward direction, the determining unit 30 determines that the vehicle 1 goes down the slope. When the moving direction of the vehicle 1 can be detected by a signal from the wheel speed sensor, it may be able to determine whether the vehicle 1 goes down the slope on the basis of even only a detection result of the wheel speed sensor.

The determining unit 30 may determine whether the actual value follows the target value on the basis of the magnitude of the deviation between the target value and the actual value. In this case, when the determining unit 30 can determine that the actual value does not follow the target value when, for example, the deviation of the position is equal to or larger than a predetermined threshold value.

After the determining unit 30 determines that the actual value does not follow the target value, the determining unit 30 can determine that the actual value begins to follow the target value when a decrease of the amount of operation after the determination is equal to or larger than a second threshold value. An amount of operation in the state in which the actual value follows the target value is smaller than an amount of operation in a state in which the actual value does not follow the target value. Thus, when the state in which the actual value does not follow the target value changes into the state in which the actual value follows the target value, the amount of operation decreases. Thus, a decrease (magnitude thereof) of the amount of operation is compared with the second threshold value to make it possible to determine whether the actual value follows the target value.

When the determining unit 30 determines whether the actual value follows the target value, the control apparatus 100 can change the control states. In the embodiment, the target value setting unit 10 and the additional amount calculating unit 40 execute processes depending on a determination result obtained by the determining unit 30.

The target value setting unit 10 can set target values in a plurality of modes. In the embodiment, for example, a first mode for setting a target value changing with elapsed time and a second mode for setting a target value which does not change with elapsed time, i.e., a constant target value are set. The target value setting unit 10 sets the target value in the first mode when the determining unit 30 determines that the actual value follows the target value. On the other hand, the target value setting unit 10 sets the target value in the second mode when the determining unit 30 determines that the actual value does not follow the target value. When the target value further changes in the state in which the actual value does not follow the target value, the deviation further increases, and the state in which the actual value does not follow the target value is hard to be canceled. With respect to this point, according to the embodiment, since a change of the target value is suppressed when it is determined that the actual value does not follow the target value, in comparison with the case in which the target value further changes, the state in which the actual value does not follow the target value may be easily canceled. The first mode may be called a normal mode, and the second mode may be called a restriction mode or a suppression mode. In the second mode, a change of the target value with elapsed time need only be smaller than that in the first mode, and the target value need not be constant. Various methods of calculating the target value can be set.

The additional amount calculating unit 40, when the determining unit 30 determines that the actual value does not follow the target value, calculates an additional amount to be added to the amount of operation to increase the amount of operation (magnitude thereof) as needed. The additional amount calculated by the additional amount calculating unit 40 is added to the amount of operation by an adder 23. The amount of operation to which the additional amount has not been added by the adder 23 is input to the determining unit 30. The state in which the actual value does not follow the target value can be understood as a state in which the amount of operation (magnitude thereof) is short. Thus, when the additional amount calculated by the additional amount calculating unit 40 is added to the amount of operation calculated by the operation amount calculating unit 21, the state in which the actual value does not follow the target value may be easily canceled. Since the magnitude of the amount of operation can be more appropriately adjusted or set by adjustment of the additional amount by the additional amount calculating unit 40, the state in which the actual value does not follow the target value may be easily canceled, or an inconvenient event may be unlikely to occur. The additional amount calculating unit 40 holds the value of the additional amount even after the state in which the actual value does not follow the target value is canceled. Thus, it is suppressed that the state returns to the state in which the actual value does not follow the target value by eliminating the additional amount when the actual value follows the target value. Various methods of increasing the amount of operation can be set. The amount of operation to which the additional amount is added may be called an input value. The additional amount can also be understood as a part of the input value or the amount of operation.

The threshold value setting unit 60 acquires obstacle data. The obstacle data is data representing a height of obstacle acquired by a sonar or the like which can detects an obstacle. The obstacle is, for example, a stone, a step, or the like on a road. The threshold value setting unit 60 can set or change the first threshold value used in the determining unit 30 on the basis of the acquired obstacle data. As the height of obstacle is high, a duration of the state in which the actual value does not follow the target value becomes long, and the amount of operation increases until a wheel (not shown) goes over the obstacle. More specifically, the amount of operation increases in proportion to the height of obstacle. As described above, in the embodiment, when the amount of operation is equal to or larger than the first threshold value, the mode of the target value setting unit 10 is switched to the second mode. Thus, for example, when the threshold value setting unit 60 sets the first threshold value depending on the height of obstacle, after the wheel goes over the obstacle, the mode of the target value setting unit 10 can be changed into the second mode soon. In this case, since feedback control is performed such that the actual comes close to the target value the change of which is suppressed immediately after the vehicle 1 goes over the obstacle, in comparison with a case in which feedback control for the target value the change of which is larger is performed, the state in which the actual value does not follow the target value is easily canceled more quickly. Since the vehicle 1 goes over the obstacle without adding the additional amount to the amount of operation, a situation in which an excessively large amount of operation is given to the object to be controlled before and after the vehicle 1 goes over the obstacle can be suppressed.

In this case, with respect to a step S illustrated in FIG. 2, a rotational moment M1 obtained by a load mg, being along a counterclockwise direction in FIG. 2, and centered on a point P at a corner of the step S can be expressed by the following numerical expression (1) when a thrust F of the vehicle 1, a radius r of a wheel, a load m, a height of step h, an angle θ of a slope, and a gravity acceleration g are given.

[Numerical Expression 1]

$$M1 = (mg \cos \theta) r\sqrt{h(2r-h)} \quad (1)$$

The rotational moment in the clockwise direction in FIG. 2 obtained by the thrust F of the vehicle 1 can be expressed by the following numerical expression (2).

[Numerical Expression 2]

$$M2 = (F - mg \sin \theta) \cdot (r-h) \quad (2)$$

Since M2>M1 must be satisfied to cause the vehicle to go over the step S, with respect to the thrust F, the following numerical expression (3) is satisfied.

[Numerical Expression 3]

$$F > \frac{(mg\cos\theta) \cdot \sqrt{h(2r-h)}}{(r-h)} + mg\sin\theta \quad (3)$$

Thus, a first threshold value Fth1 of the amount of operation corresponding to the height of the step S can be set by the following numerical expression (4).

[Numerical Expression 4]

$$Fth1 = \frac{(mg\cos\theta) \cdot \sqrt{h(2r-h)}}{(r-h)} + mg\sin\theta \quad (4)$$

Thus, the threshold value setting unit 60 can set or change the first threshold value Fth1 by assigning the height of obstacle obtained by the obstacle data to the height h in the numerical expression (4).

The control apparatus 100 is, for example, an ECU. The control apparatus 100 may be incorporated in an ECU of any system mounted on the vehicle 1 or may be an independent ECU. The control apparatus 100 may have a CPU (Central Processing Unit) (not shown), a controller, an RAM (Random Access Memory), an ROM (Read-Only Memory), a flash memory, and the like. The control apparatus 100 executes processes according to an installed and loaded program to make it possible to achieve functions. More specifically, the processes are executed according to the program to make it possible to cause the control apparatus 100 to function as the target value setting unit 10, the control unit 20, the operation amount calculating unit 21, the command value calculating unit 22, the determining unit 30, the additional amount calculating unit 40, the actual value acquiring unit 50, the threshold value setting unit 60, and the like. In a storage unit, data used in arithmetic processes in the units, result data of the arithmetic processes, and the like are stored. At least some of the units may be achieved by hardware. In the control by the control apparatus 100, in addition to the feedback control, another control such as feedforward control may be incorporated. In this case, for example, the operation amount calculating unit 21 may add an additional amount obtained by the feedforward control to the amount of operation.

An example of a control procedure by the control apparatus 100 will be described below with reference to FIGS. 3 and 4. Flows illustrated in FIGS. 3 and 4 are executed at control timings, respectively.

The actual value acquiring unit 50 acquires a detection value of the sensor 203 and an actual value based on the detection value (S10). In S10, the actual value acquiring unit 50, for example, acquires a position, an actual value of a speed, a detection value of an acceleration, and the like.

The determining unit 30 determines whether the vehicle 1 goes down a slope by gravitation (S20). In S20, the determining unit 30 determines whether the vehicle 1 goes down a slope by gravitation on the basis of, for example, an actual value of a speed and a detection value of an acceleration.

When the determining unit 30 determines in S20 that the vehicle 1 does not go down by gravitation (No in S20), the determining unit 30 sets a flag 1 to "1" (S21). The flag 1 represents whether the actual value follows the target value. "1" represents that the actual value follows the target value, and "0" represents that the actual value does not follow the target value. The flag 1 is used in determination in S40 (will be described later).

When the determining unit 30 determines in S20 that the vehicle 1 goes down by gravitation (Yes in S20), the determining unit 30 sets the flag 1 to "0" (S22), and sets a flag of an additional pattern to "1" (S23). When the flag 1 is "0", the target value is held in S42 (will be described later). When the flag of the additional pattern is "1", a constant additional amount which exhibits a step-like shape in terms of time is calculated in S43 (will be described later). This pattern is called a first additional pattern.

The determining unit 30 compares the amount of operation with the first threshold value Fth1 (S30).

When the amount of operation is smaller than Fth1 in step S30 (No in S30), the determining unit 30 sets the flag 2 to "1" (S31). The flag 2 represents whether the actual value follows the target value. "1" represents that the actual value follows the target value, and "0" represents that the actual value does not follow the target value. The flag 2 is used in determination in S40 (will be described later). When the flag 2 and the flag 1 are independently set, conditions for determining whether the actual value follows the target value can be discriminated from each other. Thus, for example, different processes can be executed depending on determined conditions, respectively.

On the other hand, when the amount of operation is equal to or larger than Fth1 in step S30 (Yes in S30), the determining unit 30 sets the flag 2 to "0" (S32). Even when the flag 2 is "0", as in the case in which the flag 1 is "0", the target value is held.

After the determining unit 30 determines that the actual value does not follow the target value in S30, the determining unit 30 executes S31 when a decrease a of the amount of operation after the determination is made is equal to or larger than a second threshold value Fth2, i.e., when the state in which the actual value does not follow the target value is estimated to be changed into the state in which the actual value follows the target value (Yes in S33). More specifically, the flag 2 is changed from "0" to "1".

On the other hand, after the determining unit 30 determines in S30 that the actual value does not follow the target value, when the state in which the actual value does not follow the target value is still estimated to be continued (No in S33), the determining unit 30 increments a count number n obtained by counting the number of times of control timings, i.e., sets n=n+1 (S34).

After S34, when the count number n is equal to or larger than a third threshold value T1, i.e., after the state in which the actual value does not follow the target value changes into the state in which the actual value follows the target value, when a predetermined period of time has elapsed (Yes in S35), the determining unit 30 sets the flag of the additional pattern to "2" (S36). The third threshold value T1 corresponds to the length of the predetermined period of time. When the flag of the additional pattern is "2", in S43 (will be described later), an additional amount which changes into a ramp-like shape in terms of time, i.e., gradually increases in terms of time is calculated. This pattern is called a second additional pattern.

After S31, after No in S35 or S36, when both the flag 1 and the flag 2 are "1", i.e., when the determining unit 30 determines that the actual value follows the target value in determination of going down of the vehicle 1 in S20 and comparison between the amount of operation and the first threshold value Fth1 in S30 (No in S40), the control apparatus 100 sets the target value such that the target value setting unit 10 executes the process in the first mode and the target value changes with time at a required change rate (S41). In S41, the target value is updated from the target value at a previous control timing. When No in S40, the additional amount is not added to the amount of operation. More specifically, the additional amount is zero (0).

On the other hand, in S40, when at least one of the flag 1 and the flag 2 is "0", i.e., when it is determined that the actual value does not follow the target value in at least one of the determination of going down of the vehicle 1 in S20 and the comparison between the amount of operation and the first threshold value Fth1 in S30 (Yes in S40), the target value setting unit 10 executes the process in the second mode and holds the target value (S42). In S42, the target value is set to the same value as that of the target value at the previous control timing.

When Yes in S40, the additional amount calculating unit 40 calculates an additional amount (S43). In S43, the additional pattern is calculated on the basis of the values of the flag 1, the flag 2, the flag of the additional pattern, and the like.

More specifically, when the flag 1, the flag 2, and the flag of the additional pattern are "0", "1", and "1", respectively, i.e., when the vehicle 1 goes down by gravitation in S20, although it is determined that the actual value does not follow the target value, when the amount of operation is smaller than the first threshold value Fth1 in S30 to determine that the actual value follows the target value, the additional amount calculating unit 40 calculates a constant additional amount in the first additional pattern, i.e., in a pattern in which the additional amount exhibits a step-like shape in terms of time.

When the flag 1, the flag 2, and the flag of the additional pattern are "1", "0", and "2", respectively, i.e., when the vehicle 1 does not go down by gravitation in S20, although it is determined that the actual value follows the target value, when the amount of operation is equal to or larger than the first threshold value Fth1 in S30 to determine that the actual value does not follow the target value, the additional amount calculating unit 40 calculates an additional amount changing in the second additional pattern, i.e., in a pattern in which the additional amount changes in a ramp-like shape in terms of time.

When both the flag 1 and the flag 2 are "0", i.e., when the vehicle 1 goes down in S20, when it is determined that the actual value does not follow the target value, and when the amount of operation is equal to or larger than the first threshold value Fth1 in S30 to determine that the actual value does not follow the target value, the additional amount calculating unit 40 can calculate an additional amount as a sum of a component a predetermined amount of which is added in a step-like shape in terms of time and a component which gradually increases in a ramp-like shape in terms of time.

When the flag of the additional pattern is neither "1" nor "2", the additional amount calculating unit 40 sets the additional amount to 0 (zero).

In the embodiment, the additional amount added by the additional amount calculating unit 40 is continuously added even after the state in which the actual value does not follow the target value is canceled. Thus, it is suppressed that the state returns to the state in which the actual value does not follow the target value by decreasing the amount of operation when the actual value follows the target value.

After S41 or S43, an amount of operation obtained by adding the additional amount from the additional amount calculating unit 40 to the amount of operation calculated by the operation amount calculating unit 21 is input to the command value calculating unit 22 (S50). The command value calculating unit 22 calculates a command value for at least one of the driving mechanism 201 and the braking mechanism 202 on the basis of the input amount of operation (S51). The command value calculating unit 22 outputs the calculated command value to at least one of the driving mechanism 201 and the braking mechanism 202 so as to control at least one of acceleration and declaration of the vehicle 1 (S52).

FIGS. 5 to 7 illustrate changes of parameters with time obtained when control is performed by the procedures in FIGS. 3 and 4.

FIG. 5 illustrates a case in which the determining unit 30 determines that the vehicle 1 goes down a slope by gravitation. As is illustrated in FIG. 5, in a period between time 0 and time t1, deviations between the target values and the actual values of a distance (position) and a speed increase with elapsed time, and an amount of operation also increases. More specifically, a situation in which the actual value does not follow the target value occurs. In this case, the determining unit 30 determines that the vehicle 1 goes down a slope by gravitation at time t1 on the basis of detection values and actual values. In this case, since the actual value does not follow the target value, the target value setting unit 10 holds the target value at a constant value in the second mode from time t1. In this case, an additional amount which is constant after time t1 is added to an amount of operation such that the amount of operation exhibits a step-like shape in terms of time in the first additional pattern. Thus, after time t1, the holding of the target value and the addition of the additional amount to the amount of operation allow the deviations between the target values and the actual values of both the distance and the speed to gradually decrease. At time t2, the determining unit 30 determines that the state changes into the state in which the actual value follows the target value because the decrease α of the amount of operation after time t1 becomes equal to or larger than the second threshold value Fth2. Thus, after time t2, the target value setting unit 10 sets target values changing with elapsed time in the first mode, and the actual values of the distance and the speed change in proportion to the target values thereof. However, the constant additional amount is held even after time t2. Thus, it is suppressed that the state returns to the state in which the actual value does not follow the target value by decreasing the additional amount at time t2. When an angle of inclination of the vehicle 1 can be acquired, the magnitude of the additional amount can be set to a magnitude depending on the angle of inclination. In this case, although the distance and the speed may exhibit negative values in the period between time 0 and time t1, in the example in FIG. 5, when the distance and the speed exhibit negative values, the distance and the speed are set to 0. When an angle of inclination of the vehicle 1 can be acquired, the magnitude of the additional amount may be set to a magnitude depending on the angle of inclination.

FIG. 6 illustrates a case in which the determining unit 30 determines that the amount of operation is equal to or larger than the first threshold value Fth1. As is illustrated in FIG. 6, in a period between time 0 and time t1, deviations between the target values and the actual values of a distance (position) and a speed increase with elapsed time, and an amount of operation also increases. More specifically, a situation in which the actual value does not follow the target value occurs. In this case, the determining unit 30 determines at time t1 that the amount of operation is equal to or larger than the first threshold value Fth1. In this case, since the actual value does not follow the target value, the target value setting unit 10 holds the target value at a constant value in the second mode from time t1. In this case, from time t3 at which the count number n+1 is equal to the third threshold value T1, an additional amount increasing with elapsed time after time t3 is added to an amount of operation in a ramp-like shape in terms of time in the second additional pattern. Thus, the holding of the target value after time t1 and the addition of the additional amount to the amount of operation after time t3 allow the deviations between the target values and the actual values of both the distance and the speed to gradually decrease. At time t2, the determining unit 30 determines that the state changes into the state the actual value follows the target value because the decrease α of the amount of operation after time t1 becomes equal to or larger than the second threshold value Fth2. Thus, after time t2, the target value setting unit 10 sets target values changing with elapsed time in the first mode, and the actual values of the distance and the speed change in proportion to the target values thereof. However, the additional amount at time t2 is held even after time t2. Thus, it is suppressed that the state returns to the state in which the actual value does not follow the target value by decreasing the additional amount at time t2.

The control illustrated in FIG. 6 is effective, for example, when a height of obstacle is not known, when an error of a result corresponding to an amount of operation caused by a detection error of the sensor 203 or another cause occurs, and the like. More specifically, for example, when a height of an obstacle is not known when rotation of a wheel is blocked by the obstacle, time at which the state in which the actual value does not follow the target value is canceled is not known, and moreover, a situation in which a magnitude of an amount of operation required to cause the wheel to go over the obstacle is not known may occur. In this case, when the amount of operation exceeds the preset first threshold value Fth1 corresponding to a certain level of height, the determining unit 30 determines that the actual value does not follow the target value, and suppression of an increase of the target value and an increase of the amount of operation can be executed. After it is determined that the actual value does not follow the target value, since an additional amount gradually increases in terms of time, a state in which an amount of operation for controlling an object to be controlled is excessive is easily avoided. In the example in FIG. 6, the additional amount, i.e., an amount of operation input to the object to be controlled linearly (linear functional) increases in terms of time. However, the additional amount is not limited to this, and a manner of increasing with time the additional amount, i.e., the amount of operation input to the object to be controlled can be variously set or changed. For example, even in a state in which an error of a result corresponding to an amount of operation occurs, i.e., a state in which a desired result cannot be obtained by the object to be controlled although a required amount of operation is input in the absence of a particular obstacle or the like, time at which the state in which the actual value does not follow the target value is canceled is not known, and moreover, a situation in which the magnitude of the amount of operation required to cause the actual value to follow the target value is not known may occur. Also in this case, as in the case in which the height of obstacle is known, when the amount of operation exceeds the preset first threshold value Fth1, the determining unit 30 determines that the actual value does not follow the target value, and suppression of an increase of the target value and an increase of the amount of operation can be executed. After it is determined that the actual value does not follow the target value, since an additional amount gradually increases in terms of time, a state in which an amount of operation for controlling an object to be controlled is excessive is easily avoided.

In the case in FIG. 6, the third threshold value T1 is set to set the additional amount to 0 (zero) in a period between time t1 and time t2. When the wheel goes over an obstacle almost at time t1, when an additional amount is added to increase the amount of operation, an acceleration may increase unnecessarily. With respect to this point, according to the embodiment, in a period between time t1 and time t2, the amount of operation is prevented from increasing to easily avoid such a situation. The setting of the additional amount is more effective when an obstacle data cannot be acquired.

FIG. 7 illustrates a case in which the first threshold value Fth1 is set depending on a height of obstacle. As illustrate in FIG. 7, also in this case, as in the case in FIG. 6, in a period between time 0 and time t1, deviations between target values and actual values of a distance (position) and a speed increase with elapsed time, and an amount of operation also increases. More specifically, a situation in which the actual value does not follow the target value occurs. Also in this case, the determining unit 30 determines at time t1 that the amount of operation is equal to or larger than the first threshold value Fth1. In this case, since the actual value does not follow the target value, the target value setting unit 10 holds the target value at a constant value in the second mode from time t1. However, in the example in FIG. 7, since the first threshold value Fth1 is set depending on the height of obstacle, a wheel goes over the obstacle almost at time t1, and, after time t1, even though an additional amount is not added, a probability of decreasing a deviation between a target value and an actual value is high. Thus, when the threshold value setting unit 60 sets the first threshold value depending on the height of obstacle, the additional amount calculating unit 40 can set the additional amount to 0 (zero). Control performed after time t1 is the same as those in the cases in FIGS. 5 and 6 except that the additional amount is set to 0. In this case, since the additional amount is not added to the amount of operation, the state in which the amount of operation for controlling an object to be controlled is excessive is easily avoided.

As has been described above, in the embodiment, the target value setting unit 10 (target position setting unit) sets a target value changing with elapsed time when the determining unit 30 determines that the actual value (actual position) follows the target value (target position), and, when the determining unit 30 determines that the actual value does not follow the target value, sets the target value such that a change of the target value with elapsed time is smaller than that obtained when the determining unit 30 determines that the actual value follow the target value. Thus, for example, when it is determined that the actual value does not follow the target value, since a change of the target value is suppressed, in comparison with a case in which the target value changes more largely, an increase of the amount of operation is suppressed. Thus, for example, it is easily suppressed that an amount of operation for controlling an object to be controlled is excessive.

In the embodiment, for example, the determining unit 30 determines that the actual value does not follow the target value when the amount of operation is equal to or larger than the first threshold value. Thus, for example, the state in which the actual value does not follow the target value can be determined more easily or accurately.

In the embodiment, for example, when it is detected that the vehicle 1 goes down a slope by gravitation, the determining unit 30 determines that the actual position does not follow the target position. Thus, for example, the state in which the vehicle 1 goes down a slope by gravitation can be canceled more rapidly.

In the embodiment, for example, when a decrease of an amount of operation after it is determined that the actual value does not follow the target value is equal to or larger than the second threshold value, the determining unit 30 determines that the actual value begins to follow the target value. Thus, for example, it can be determined more easily or more accurately that the state in which the actual value does not follow the target value recovers to the state in which the actual value follows the target value.

In the embodiment, for example, when the determining unit 30 determines that the actual value does not follow the target value, the additional amount calculating unit 40 for calculating an additional amount added to the amount of operation is included. Thus, for example, when the amount of operation is increased, the state in which the actual value does not follow the target value is easily canceled.

In the embodiment, for example, the additional amount calculating unit 40 outputs the additional amount which does not change in terms of time after the determining unit 30 determines that an actual position does not follow a target position. Thus, for example, the state in which the actual position does not follow the target position is easily and quickly canceled.

In the embodiment, for example, the additional amount calculating unit 40 increases the additional amount with elapsed time. When the increase of the additional amount is stopped when the determining unit 30 determines that the actual position follows the target position, and after that time, the additional amount is held at a constant value. Thus, for example, it is easily suppressed that an amount of operation for controlling an object to be controlled is excessive. It can be suppressed that the state returns to the state in which the actual position does not follow the target position by eliminating the additional amount when it is determined that the actual position follows the target position.

In the embodiment, for example, the threshold value setting unit 60 which changes the first threshold value depending on a height of obstacle is included. Thus, for example, a wheel can go over an obstacle when an additional amount is small, and a change of a target value can be suppressed when the wheel goes over the obstacle. For this reason, it is easily suppressed that an amount of operation for controlling an object to be controlled is excessive.

Although the embodiment of the present invention has been illustrated above, the embodiment is only an example and does not intend to limit the scope of the invention. The embodiment can be executed in other various modes, and various omissions, replacements, combinations, and changes can be effected without departing from the scope of the invention. Specifications (structures, types, numbers, and the like) of configurations, shapes, and the like can be arbitrarily changed and achieved.

The invention claimed is:

1. A vehicle traveling control apparatus comprising:
   an operation amount calculating unit which calculates an amount of operation for controlling at least one of a driving mechanism and a braking mechanism of a vehicle to decrease a deviation between a target position and an actual position of the vehicle;
   a determining unit which determines whether the actual position follows the target position; and
   a target position setting unit which, when the determining unit determines that the actual position follows that the target position, sets the target position changing with elapsed time and, when the determining unit determines that the actual position does not follow the target position, sets the target position such that a change of the target position with elapsed time is smaller than the change of the target position with elapsed time when the determining unit determines that actual position follows the target position.

2. The vehicle traveling control apparatus according to claim 1, wherein the determining unit determines that the actual position does not follow the target position when the amount of operation is equal to or larger than a first threshold value.

3. The vehicle traveling control apparatus according to claim 2, comprising a threshold value setting unit which changes the first threshold value depending on a height of an obstacle.

4. The vehicle traveling control apparatus according to claim 1, wherein the determining unit determines that the actual position does not follow the target position when it is detected that a vehicle goes down a slope by gravitation.

5. The vehicle traveling control apparatus according to claim 1, wherein the determining unit determines that the actual position begins to follow the target position when a decrease of the amount of operation after the determining unit determines that the actual position does not follow the target position is equal to or larger than a second threshold value.

6. The vehicle traveling control apparatus according to claim 1, comprising an additional amount calculating unit which calculates an additional amount added to the amount of operation when the determining unit determines that the actual position does not follow the target position.

7. The vehicle traveling control apparatus according to claim 6, wherein the additional amount calculating unit calculates the additional amount which is constant in terms of time after the determining unit determines that the actual position does not follow the target position.

8. The vehicle traveling control apparatus according to claim 6, wherein the additional amount calculating unit increases the additional amount with time, stops the increase of the additional amount when the determining unit determines that the actual position follows the target position, and holds the additional amount added to the amount of operation constant after that time.

\* \* \* \* \*